United States Patent

[11] 3,627,335

[72] Inventor John H. Wheeler
 3921 Marquette St., Dallas, Tex. 75225
[21] Appl. No. 882,930
[22] Filed Dec. 8, 1969
[45] Patented Dec. 14, 1971

[54] PACKING MEMBER
 11 Claims, 6 Drawing Figs.
[52] U.S. Cl. .................................................. 277/205
[51] Int. Cl. .................................................. F16j 15/32
[50] Field of Search ........................................ 277/205, 206, 206.1, 216

[56] References Cited
UNITED STATES PATENTS

| | | | |
|---|---|---|---|
| 2,372,095 | 3/1945 | Leistensnider et al. | 277/205 |
| 2,877,071 | 3/1959 | Arnot | 277/216 |
| 2,979,350 | 4/1961 | Lansky | 277/205 |

Primary Examiner—Robert I. Smith
Attorney—Richards, Harris & Hubbard

ABSTRACT: A packing member comprises an annular body having inner and outer sealing lips extending from one of its ends and from a point near its axial center, respectively. A plurality of holes extend axially into the body from equally spaced points along a circle concentric with the body. The member may be split along a line extending through at least two angles axially of the body, if desired.

PATENTED DEC 14 1971 3,627,335

INVENTOR
JOHN H. WHEELER

Richards, Harris & Hubbard
ATTORNEY 3,627,335

PACKING MEMBER

BACKGROUND OF THE INVENTION

In mechanical devices it is frequently necessary to form a seal at the point of intersection of various walls, etc. and shafts or other cylindrical members extending therethrough. One method of forming such a seal is to position a packing member between the two members. Typically, packing members include inner and outer sealing lips and are mounted with the lips facing the high-pressure side of the intersection.

In the past, most packing members have comprised ring-shaped members having V-shaped or truncated V-shaped cross sections. This invention relates to an improved packing member in which the inner and outer sealing lips are axially offset from each other. A plurality of holes extend axially into the member to reduce pressure concentrations and to permit the member to operate as a radial spring. The packing member may be cut along a wavy line to permit installation.

SUMMARY OF THE INVENTION

In accordance understanding the preferred embodiment, this invention comprises a packing member having a plurality of holes extending axially into it. Preferably, the member includes an outer sealing lip that extends outwardly from one point and an inner sealing lip that extends inwardly from an axially spaced point.

DESCRIPTION OF THE DRAWING

A more complete understanding of the invention may be had by referring to the following detailed description when taken conjunction with the drawing, wherein.

DETAILED DESCRIPTION

Figures 1, 2:
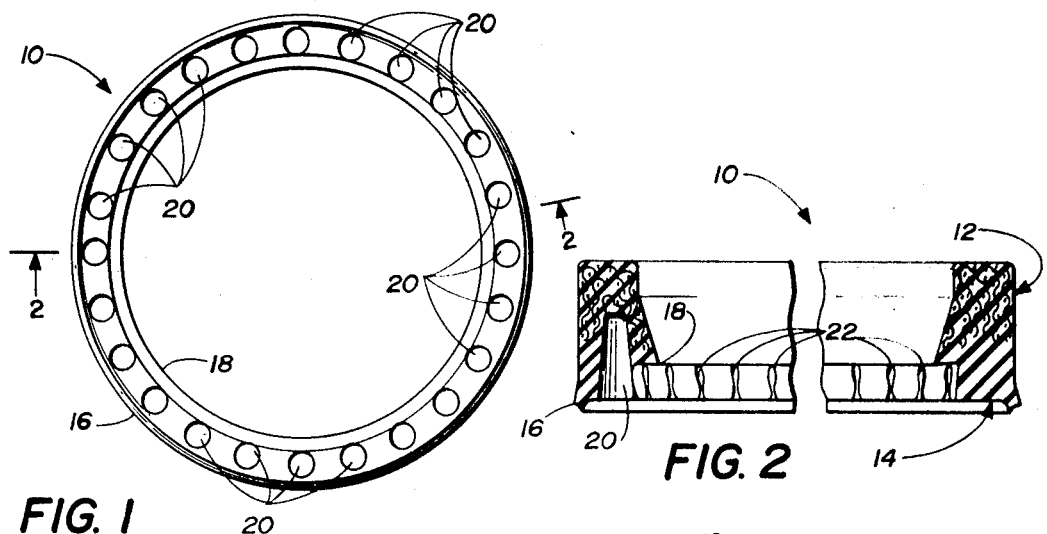
FIG. 1 is a bottom view of a first embodiment of the invention.
FIG. 2 is a transverse sectional view taken generally along the line 2—2 in FIG. 1.
Figure 3:
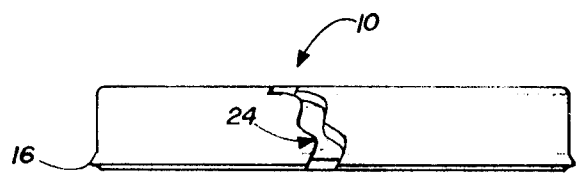
FIG. 3 is a side view of the embodiment shown in FIG. 1.

Referring now to the drawing, and particularly to FIGS. 1, 2 and 3, a first embodiment of the invention is shown. The first embodiment comprises a packing member 10 including an upper portion 12 and a lower portion 14. The packing member 10 is integrally formed from an elastic material such as rubber, plastic, etc. The upper portion 12 and the lower portion 14 are, however, made relatively rigid and relatively resilient, respectively, by forming the upper portion 12 around a body of reinforcing material, such as cloth.

The packing member 10 has an outer sealing lip 16 formed along its outer surface at the lower edge thereof and has an inner sealing lip 18 formed around its inner surface at a point near its axial center. In use, the packing member 10 is positioned at the point of intersection of a cylindrical member such as a shaft and a wall such as a housing. The packing member 10 is mounted with the lips 16 and 18 facing the high pressure side of the intersection and in engagement with the housing and the cylindrical member, respectively.

The packing member 10 also has a plurality of holes 20 formed in it. The holes 20 extend axially into the member 10 from equally spaced points along a circle extending around the bottom of the member. Each hole 20 extends through the lower portion 14 of the member 10 and into the upper portion 12, thereof. Each hole 20 also extends through the inner surface of the lower portion 14 to form an opening 22.

The holes 20 play several very important functions in the operation of the packing member 10. First, the holes 20 allow the material of the packing member 10 to distribute itself more uniformly as the packing member is used. This permits the packing member 10 to form a more effective seal. Second, the holes 20 reduce stress concentrations in the packing member 10 and thereby reduce the wear of the packing member. Third, the holes 20 permit the packing member 10 to operate as a radial spring. This permits the packing member 10 to absorb a certain amount of eccentricity between a cylindrical member and a wall.

In many applications, the packing member 10 is employed in multiple. That is, a plurality of packing members are mounted adjacent each other in a stuffing box or the like. In such a case, the openings 22 formed by the holes 20 provide access to the holes 20. In other words, the openings 22 prevent the upper end of one packing member from blocking the holes 22 of the next adjacent packing member.

It is preferably that the packing member 10 comprise a continuous annulus since such a packing member is less likely to leak. However, in some situations it is necessary to split the packing member in order to permit its installation between cylindrical members and walls that cannot be readily disassembled. Referring specifically to FIG. 3, the packing member 10 is preferably cut along a wavy line 24 for use in split-ring applications. The line 24 extends through three angles axially of the member 10 and at an angle radially thereof. It has been found that such a split is far superior to the simple radial or diagonal splits that are conventionally employed in packing members.

Figure 4:
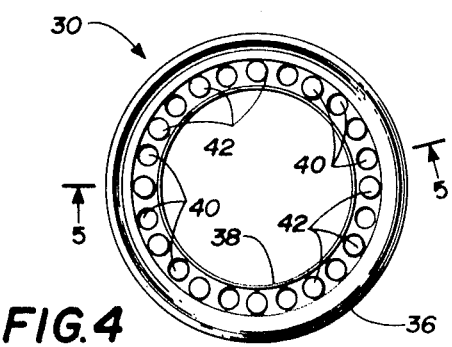
FIG. 4 is a bottom view of a second embodiment of the invention.
Figure 5:
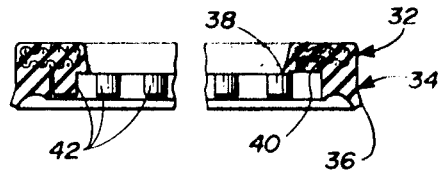
FIG. 5 is a sectional view taken generally along the line 5—5 in FIG. 4.
Figure 6:
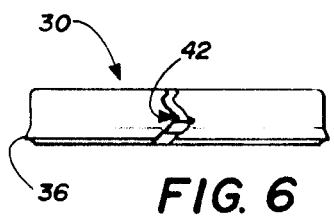
FIG. 6 is a side view of the embodiment shown in FIG. 4.

Referring now to FIGS. 4, 5 and 6, a second embodiment of the invention is shown. The second embodiment comprises a packing member 30 including a relatively rigid upper portion 32 and a relatively flexible lower portion 34. The packing member 30 is similar to the packing member 10 in that it has an outer sealing lip 36 formed along its outer surface at the lower edge thereof and has an inner sealing lip 38 formed along its inner surface at a point near its axial center.

The packing member 30 is further similar to the packing member 10 in that it has a plurality of holes 40 extending into it. The member 30 differs from the member 10 in that the holes 20 extend axially into the member 30 from equally spaced points around the lower surface of the upper portion 32. That is, the holes 40 do not extend through the lower portion 34 of the member 30. The member 30 also differs in the member 10 in that it includes a plurality of projections 42 which extend axially from the bottom of the upper member 32 at points positioned between the holes 40 formed therein.

In use, the packing member 30 is positioned between a cylindrical member and a wall to form a seal therebetween. The holes 40 in the member 30 function similarly to the holes 20 of the member 10 to promote uniform distribution of the material of the packing member, to reduce the pressure concentrations and to permit the member 30 to act as a radial spring. The projections 42 function to provide separation and to assure access to the holes 40 when the packing member 30 is used in multiple. As is shown in FIG. 6, the packing member 30 is is preferably split along a wavy line 44 that extends through two angles axially of the member for use in split ring applications.

It is convenient to consider the packing member according to the present invention as comprised to two annular bodies. The first annular body is rectangular in cross section and is relatively rigid. An inner sealing lip extends from the inner edge of one end of the first annular body. The second annular body extends from the one end of the first annular body, is rectangular in cross section and is relatively resilient. An outer sealing lip extends from the outer edge of the second annular body that is remote from the first annular body. So considered, it will be seen that the first and second embodiments of the invention are similarly constructed except for the relative dimensions of the annular bodies comprising the two embodiments.

The two embodiments of the invention differ principally in that in the first embodiment, the holes extend through the second annular body and into the first annular body, whereas in the second embodiment the holes are formed entirely in the first annular body. Another difference is that in the first embodiment, access to the holes is provided through the openings 22 in the inner walls of the second annular body whereas in the second embodiment access to the holes is assured by the projections 42. These differences in form between the two embodiments do not, however, cause the two embodiments to operate differently.

It should be understood that the packing member according to the present invention is ordinarily employed in applications in which a cylindrical member rotates and/or reciprocates relative to a housing or the like. Conversely the packing member can be employed in situations wherein an exterior member moves relative to a stationary cylindrical member. Also, the packing member can be employed as a seal in pistons, etc. In such a case, it is frequently desirable to employ two packing members or sets thereof, one positioned with its lips facing one direction and the other positioned with its lips facing the opposite direction. Finally, the packing member can be employed to form a seal between two stationary members, if desired.

Although only two embodiments of the invention are illustrated in the drawings and described herein, it will be understood that the invention is not limited to the embodiments disclosed but is capable of rearrangement, modification and substitution of parts and elements without departing from the spirit of the invention.

What is claimed is:

1. A packing member comprising an annular body having a plurality of holes extending axially into it, having a first sealing lip extending radially from it on one side of the holes, having a second sealing lip extending radially from it on the other side of the holes and including a plurality of projections each extending axially from the body at a point between two of the holes.

2. The packing member according to claim 1, wherein one of the lips is displaced axially of the body from the other lip.

3. The packing member according to claim 1, wherein the first lip extends outwardly of the body and is positioned at one end thereof and wherein the second lip extends inwardly of the body and is positioned between the ends thereof.

4. The packing member according to claim 1, wherein the holes extend into the body from points positioned at evenly spaced intervals along a circle that is concentric with the body.

5. The packing member according to claim 1, wherein the annular body is severed along a line that extends through at least two angles axially of the body.

6. The packing member according to claim 5, wherein the line also extends at an angle radially of the body.

7. A packing member comprising:
an annular body having a plurality of holes extending axially into it from spaced points along a circle concentric with and extending around one end of the annular body, said holes each including a portion which intersects the inner wall of the annular body to provide an opening therethrough;
a first sealing lip extending radially inwardly from the midportion of the annular body; and
a second sealing lip extending radially outwardly from the said one end of the annular body.

8. The packing member according to claim 7, wherein the holes in the annular body extend axially into the body substantially beyond the points of intersection of the holes with the inner wall of the body.

9. The packing member according to claim 7, wherein the first sealing lip extends radially inwardly from the point adjacent the points of intersection of the axially extending holes with the inner wall of the annular body.

10. The packing member according to claim 7, further including a body of fabric reinforcing material formed through the end of the annular body opposite said one end.

11. The packing member according to claim 7, wherein the annular body is severed along a line extending through at least two angles axially of the body and at an angle radially of the body.

* * * * *